United States Patent [19]
Kornylak et al.

[11] 3,824,057
[45] July 16, 1974

[54] CONTINUOUS MOLDING CONVEYOR WITH SIDE CLAMPING AND RELEASE

[75] Inventors: Andrew T. Kornylak; Charles P. Tabler, both of Hamilton, Ohio

[73] Assignee: Kornylak Corporation, Hamilton, Ohio

[22] Filed: Sept. 20, 1972

[21] Appl. No.: 290,744

[52] U.S. Cl............... 425/329, 264/47, 425/371, 425/441, 425/817 C
[51] Int. Cl............................................. B29d 27/00
[58] Field of Search............ 425/371, 115, 4 C, 329, 425/817 C, 441, 110, 363; 164/278; 226/172; 264/45, 47, 54

[56] References Cited
UNITED STATES PATENTS
3,594,866  7/1971  Skinner........................... 425/371 X

*Primary Examiner*—R. Spencer Annear
*Assistant Examiner*—Mark Rosenbaum
*Attorney, Agent, or Firm*—Thomas E. Beall, Jr.

[57] ABSTRACT

Plastic is foamed in a pressure tunnel portion of a molding conveyor formed by opposed endless conveyor runs with side pieces defining the product cross section. One or both employed the endless runs, preferably the bottom conveyor run is laterally split into at least two separate endless shiftable conveyors respectively carrying the side pieces forming the sides of the pressure tunnel, which shiftable conveyors are laterally movable, with respect to the conveying or molding direction, at the tunnel entrance and the tunnel exit for clamping and unclamping respectively, that is for bringing the side pieces horizontally toward each other transverse to the molding direction to form the final configuration for the tunnel cross section and away from each other at the molding tunnel exit to release the sides of the molded product. This clamping and unclamping of the side pieces is particularly important with molded sheets having a configured edge so that the side pieces may be constructed with a corresponding configuration. Preferably, the two shiftable endless conveyors are constructed of a series of plates having pivotal connections therebetween to form a chain, which connections will allow additional sliding or shifting of the plates with respect to each other within a limited range, preferably under the control of guide means on the individual plates and stationary support structure. Preferably, the guide means are rollers on the plates engaging within stationary tracks. A flexible cover endless belt may be employed to bridge the joint between the shiftable endless conveyors and form the entire bottom surface for the tunnel portion. After the lower shiftable conveyors have been moved toward each other to their final tunnel configuration, a flexible endless belt may be tightly brought into contact with the tops of the side pieces and clamped by the upper rigid endless conveyor, so that through the unsupported tunnel portion, the upper belt will be tightly held at its opposite ends and not subject to sagging while forming a smooth continous upper wall for the molding pressure tunnel.

17 Claims, 5 Drawing Figures

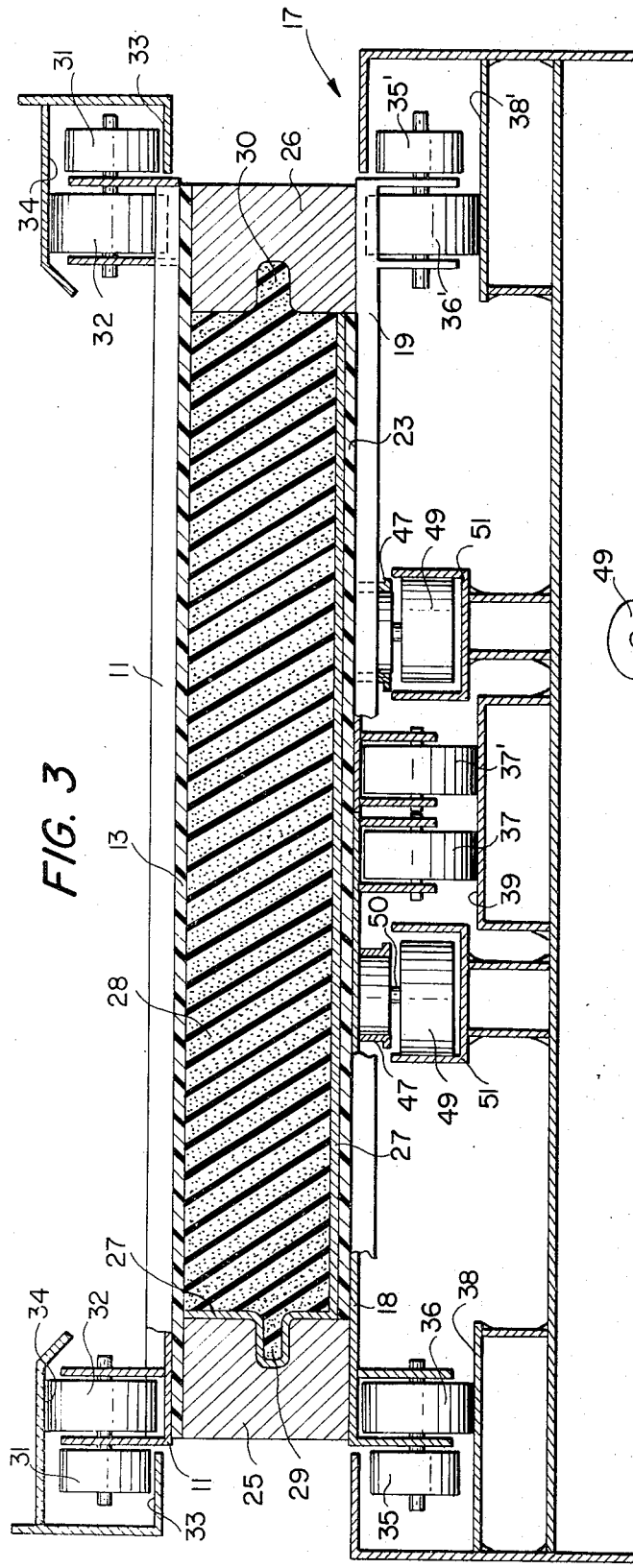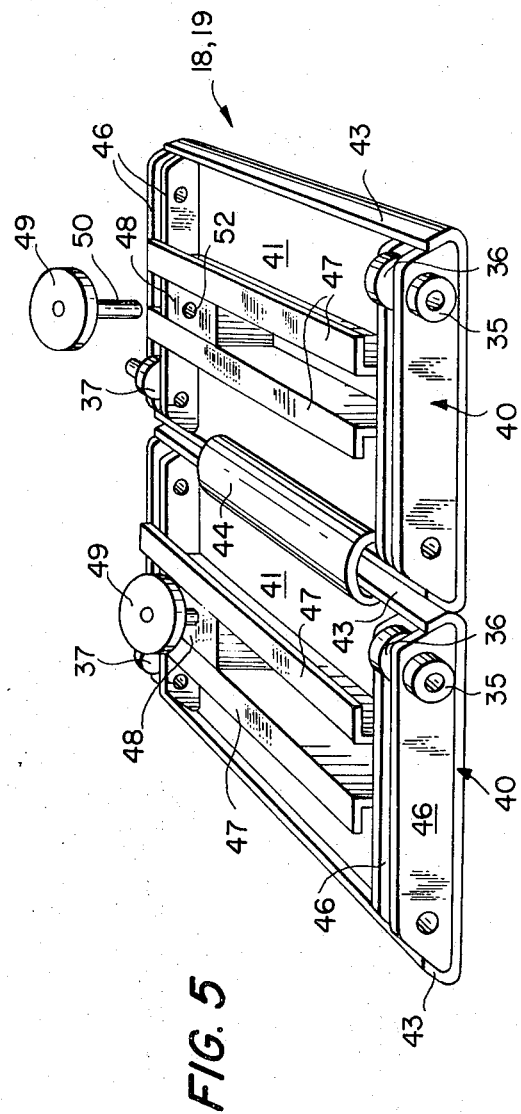

CONTINUOUS MOLDING CONVEYOR WITH SIDE CLAMPING AND RELEASE

BACKGROUND OF THE INVENTION

Rigid foam sheets are lightweight, strong and have good insulating properties making them highly desirable for construction materials. As construction panels for forming walls, it is known to form such materials with interlocking edge configurations for reducing air infiltration and alignment purposes, for example in the construction of walls. However, the formation of such configured edges, particularly with a composite structure, presents considerable problems with respect to molding, which are further complicated if continuous molding is contemplated.

SUMMARY OF THE INVENTION

The continuous molding conveyor of the present invention is of the type that has two opposed endless runs with side pieces for forming a uniform cross section linearly moving pressure tunnel in which foam or other material may be molded and at least partially cured or set to continuously form sheet material. Operating pressure, due to the foaming, may, as an example, be approximately 5 psi within the tunnel portion, which for substantial widths of sheet material being formed will involve considerable pressures on the endless conveyor structure that is generally only supported at its opposite ends. The rigid endless conveyors that will satisfactorily accommodate these and higher pressures, if desired, for the present invention are of the type disclosed in the patent to Kornylak, U.S. Pat. No. 3,082,861, issued Mar. 26, 1963, the disclosure of which is incorporated herein in its entirety.

Since the above type of rigid backup conveyor has openings or discontinuities between adjacent plates, it is desirable to cover these rigid conveyor belts with a continuous uninterrupted flexible conveyor belt to form a smooth surface throughout the entire pressure tunnel portion; such flexible belts may also be configured to produce a desired pattern on the material being molded.

In the specific embodiment of the present invention, the lower rigid portion of the endless conveyor run is split into aligned transversely adjacent, with respect to the molding direction, endless conveyors, each of the above-mentioned type. The plates of these conveyors are pivotally connected together to form a chain, with the pivotal connections allowing limited transverse relative movement between adjacent plates. Each of the plates preferably has at least one roller with a vertical axis and being received within a guide channel so that the adjacent plates of the adjacent lower conveyors may be moved toward each other at the entrance to the tunnel and away from each other at the exit of the tunnel so that the rigid side pieces respectively carried by the plates of the shiftable conveyors may be correspondingly moved toward each other to form the final cross sectional configuration of the pressure tunnel at the pressure tunnel entrance and moved away from each other at the pressure tunnel exit for unclamping or releasing the final molded product. Such unclamping or releasing is particularly important in the formation of sheet material with a configured edge where vertical movement of the side pieces, such as the side pieces moving in an arcuate path to travel along the return portion of the endless run would break off or damage such configured edges. With the present invention, the side pieces may be moved away from the configured edge such that there will be no interference between the side pieces and configured edge of the molded product when the side pieces move in the arcuate vertical path to their return run. Further, these side pieces are rigid to resist the molding pressure forces, particularly of foaming plastic, or provide a backup support for a similarly configured sheet to be laminated, or provide a molding cavity in which a thin flexible sheet may be molded due to the foaming pressure.

Further, the side pieces will be in their final pressure tunnel position along with the entire lower endless conveyor run at the tunnel entrance, so that at the entrance a flexible cover conveyor may be tautly applied to the upper surfaces of the side pieces and immediately rigidly clamped by the upper rigid endless conveyor, so that the upper flexible cover conveyor will not thereafter sag or wrinkle within any portion of the pressure tunnel.

Further, a flexible cover belt of an endless conveyor will overlie the joint between the adjacent shiftable conveyors and form the entire bottom surface for the pressure tunnel. The upper and lower flexible cover belts may be smooth, or have any desired configuration for imparting a three-dimensional corresponding configuration to the molded material, but in either event they will present a uniform surface throughout the entire extent of the pressure tunnel.

Further, it is contemplated that the laterally adjacent endless conveyors may be on the top instead of the bottom, or both and further that only one of such adjacent conveyors may be shiftable. With only one conveyor shiftable laterally, a product may be produced with only one undercut edge, or a product may be produced with opposed undercut edges and flexed laterally at the tunnel exit approximately one-half of the lateral conveyor shift, to clear both configured opposed side pieces.

Further, it is contemplated that after the upper flexible cover belt has been clamped at its opposite edges to the side pieces by the upper rigid conveyor, at the pressure tunnel entrance, the lower shiftable endless conveyors may be shifted slightly away from each other to tautly stretch the flexible conveyor or smooth out any wrinkes in it, in the lateral direction. To assist this stretching, the upper surfaces of the side pieces may be formed with a friction or biting surface to tightly grip the upper flexible belt edges, and the upper backup rigid conveyor plates may be smooth surface to provide a good sliding bearing for the lateral stretching of the upper flexible belt. With this additional feature, the small gap produced between the adjacent lower shiftable rigid conveyors would be satisfactorily bridged by the lower flexible spanning conveyor belt.

BRIEF DESCRIPTION OF THE DRAWING

Further objects, features and advantages of the present invention will become more clear from the following detailed description of a preferred embodiment according to the present invention as shown in the drawing, wherein:

FIG. 3 is a partial cross sectional view taken along line 3—3 of FIG. 1;

FIG. 5 is a perspective view of the underside, that is the side away from the molded product supporting surface, of adjacent links of a shiftable conveyor, with a guide roller in exploded position.

DETAILED DESCRIPTION OF THE INVENTION

A preferred embodiment of the present invention is shown in FIGS. 1–4, although it may take many different forms, as will be partially set forth below.

Figure 1:
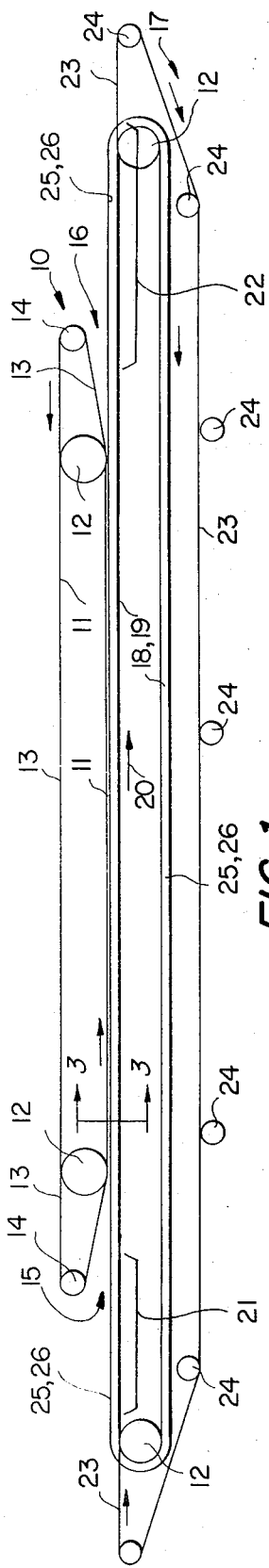
FIG. 1 is a somewhat schematic side elevation view of the molding system according to the present invention.
Figure 2:
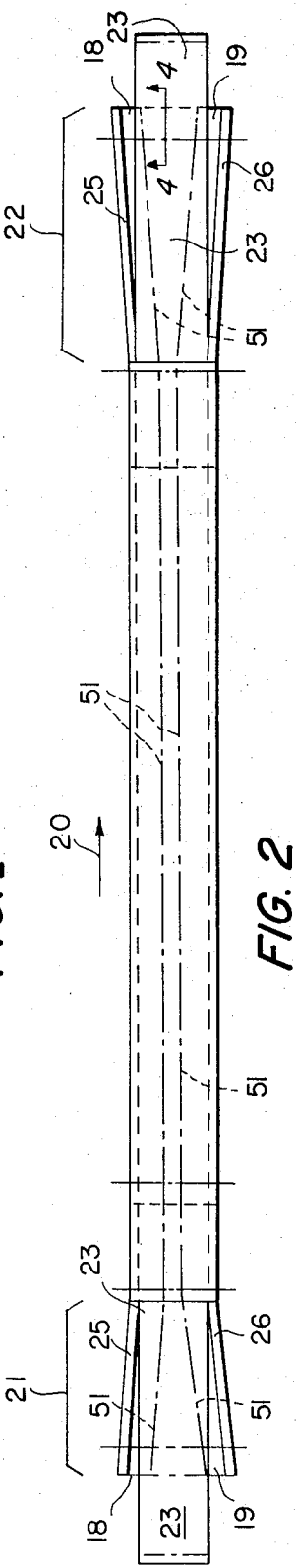
FIG. 2 is a somewhat schematic top plan view of the system of FIG. 1.

As shown in FIGS. 1 and 2, the continuous molding apparatus of the present invention includes an upper endless molding conveyor run 10 having a first rigid backup link or plate chain conveyor 11, which is of the type disclosed in the above-mentioned U.S. Pat. No. 3,082,861. This rigid molding conveyor is guided by and travels around spaced drive wheels or sprockets 12, and may be supported by additional intermediate driving or idling sprockets or wheels (not shown). Since the rigid chain is made up of a plurality of linked plates, with small gaps therebetween, it is many times desirable to cover this rigid conveyor with a flexible continuous belt that may be smooth or provided with a desirable three-dimensional configuration to respectively impart to the upper surface of the molded product a smooth continuous surface or a continuous threedimensionally configured surface as desired. Such an upper endless flexible cover belt 13 encloses the rigid conveyor chain belt 11 and is guided at its opposite ends around driving or idler pulleys 14. It is seen that the flexible belt 13 in traveling from the smaller upper pulleys 14 to the adjacent lower and larger sprockets 12 will deviate from the horizontal to provide an entrance opening 15 and an exit opening 16 between the upper endless molding conveyor run 10 and the lower endless molding conveyor run 17.

The lower endless molding conveyor run 17 includes two endless rigid conveyor belts generally of the type disclosed in U.S. Pat. No. 3,082,861, which are horizontally aligned and side by side as shown at 18 and 19. As particularly shown in FIG. 2, these horizontally adjacent rigid conveyors 18, 19 are shifted from a spaced apart position to an immediately adjacent position in the conveying or molding direction 20 as they travel through a clamping zone 21 and are shifted from such immediately adjacent position to a spaced apart position as they travel in the conveying or molding direction 20 in an unclamping zone 22, at least for the upper portion of the lower conveyor run. The upper surfaces of the rigid conveyors 18, 19 are covered, for the upper portion of the lower endless molding conveyor run 17, by an endless flexible continuously smooth or desirably configured conveying and molding belt 23. The flexible cover belt 23 is guided about a plurality of wheels 24, all of which wheels may be idle so that the rigid conveyor belt drives the flexible belt, or some of which wheels may be driving.

Each of the rigid conveyors 18, 19 has along its outer edge an effectively continuous rigid outwardly extending side flange, which in fact is made up of a plurality of side pieces or blocks respectively secured to the individual conveyor chain plates. These side pieces or flanges, respectively 25, 26, for the conveyors 18, 19 extend outwardly and upwardly from the cover belt 23 along the upper horizontal portion of the lower endless molding conveyor run 17 to tightly clamp the upper flexible belt 13 against its backup upward rigid conveyor 11, between the sprockets 12, which forms a closed linearly moving pressure tunnel, generally of rectangular shape, moving in the conveying or molding direction 20 between the upper two sprockets 12.

The configuration of this pressure tunnel is more clearly shown in FIG. 3, and is defined by upper wall formed by the cover belt 13, lower wall defined by the flexible cover belt 23, one side wall formed by the side flange or side piece 25, and the remaining side wall formed by the opposed side flange or side piece 26. The side pieces 25, 26 may have a molding configuration of any form, including undercut portions as shown, since these side pieces are unclamped from the final rigid or semi-rigid product in the unclamping zone 22 to provide for vertical clearance. As an example of a representative product, the molding system of the present invention may form a composite building panel composed of an outer cover laminate of paper, cardboard, thin sheet metal, sheet plastic, or the like 27, filled with rigid foam synthetic resin 28, for example polystyrene. As shown, the side pieces or flanges 25, 26, the cover laminate 27, and the foam resin filling have edge configurations employing undercut portions at 29, 30. If the outer cover laminate 27 is sufficiently flexible, it may be pushed into the molding cavity of the side flange 25, by the pressure of the expanding foam resin, or may be self-sustaining and initially formed into such shape. The foam directly contacts the flange 26, with a release coating applied to the flange 26 immediately prior to molding if the side pieces are not of a self-releasing material such as teflon.

In a manner similar to that set forth in the above-mentioned patent, the upper rigid conveyor 11 is supported and guided by means of guided support rollers 31, 32, respectively engaging stationary guide tracks 33, 34. In a similar manner, the lower rigid backup conveyor 18 is provided with guide and support rollers 35, 36, 37. The rollers 31, 35 are primarily used for supporting the conveyor during its return run, and the rollers 32, 36, 37 are primarily employed to support the conveyor within the pressure tunnel and absorb the upward force on the upper rigid conveyor 11, and the downward forces on the lower rigid conveyors 18, 19 produced by the expanding foam plastic during molding, with the rollers 36, 37 engaging rigid and stationary guide tracks 38, 39 respectively.

In a similar manner, the rigid conveyor 19 has rollers 35', 36', 37' associated with stationary rigid tracks 38' and 39. This roller and support track system for the rigid conveyor 19 operates in the same manner as the similar mirror image support system for rigid conveyor 18. The track portions 38', 33, 34, 38, 39 may be rigidly connected with the support frame for the system and constructed of fabricated sheet steel, preferably by welded fabrication.

Figure 4:
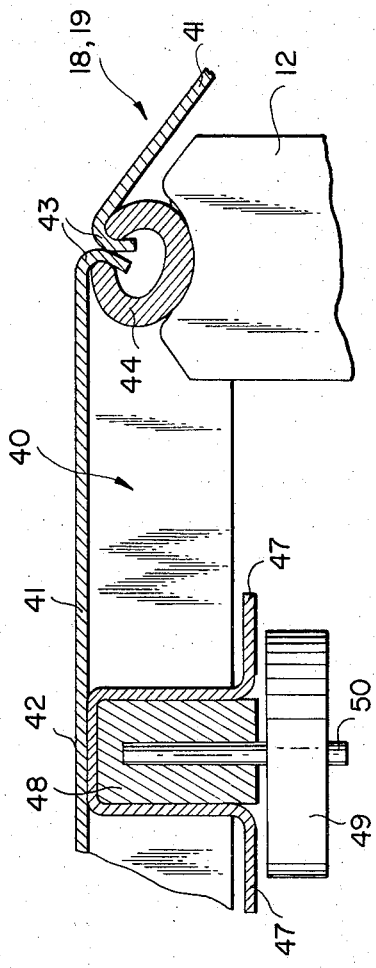
FIG. 4 is a partial cross sectional view generally taken along line 4—4 of FIG. 2.

As shown more clearly in FIGS. 4 and 5, each of the lower rigid conveyors 18, 19 is constructed of a plurality of substantially identical plates or links 40. Each of these links 40 includes a base plate 41 having an outer smooth molding surface 42, and opposed arcuate end flanges 43. The links are connected together by C-shaped cross section connectors 44 engaging the end flanges 43 of adjacent links, to secure them together as a chain and form the driving surface for, for example, the sprockets 12.

Preferably by welded construction, the links 40 are each provided with parallel side flanges 46 to form the bearings for the above-mentioned rollers 35, 36, 35', 36', 37, to reinforce the end flanges 43 and base plate 41, and to prevent the connectors 44 from sliding parallel to their length completely off of the end flanges 43. The space between the adjacent inner side flanges 46 is substantially greater than the length of the connector 44, so that within the range of twice this difference, adjacent links 40 may slide relative to each other in the direction of the connector 44 and end flanges 43, while remaining an integral part of the chain. This relative sliding motion will provide for the previously mentioned clamping and unclamping within the zones 21, and 22, respectively.

A roller and track system is provided to control the above-mentioned lateral or side shifting of the links 40. Reinforcing channel members 47 are preferably welded to the base plates 41 on their surface opposite from their molding surface 42 for reinforcement purposes and to mount bearing blocks 48. These bearing blocks 48 in turn rotatably support side shift rollers 49 by means of their shafts 50 received within bores 51 of the blocks 48. The downwardly depending vertical axis rollers 49 are received within guide tracks 51. The guide tracks 51, as particularly shown in FIG. 2, converge within the clamping zone 21, run parallel to each other through the pressure tunnel zone, and diverge within the unclamping zone 22, all with respect to the direction of molding or conveying 20, for the upper portion of the lower endless conveying and molding run 17.

In the practice of the present invention, other types of rigid conveyors may be employed, the flexible cover belts may be eliminated, the side pieces 26 may take on many different shapes, and the shiftable rigid conveyors carrying the side pieces may be placed on the top or one of them may be eliminated. If only one of the rigid lower conveyors 18, 19 is shiftable away from the other laterally stationary conveyor adjacent thereto, only the side piece for the shiftable conveyor may be provided with an undercut molding configuration; alternatively both side pieces, carried by the shiftable and non-shiftable lower rigid conveyors may be provided with undercut surfaces and the shiftable conveyor moved laterally at least twice the distance of undercut so that the rigid molded product may be flexed laterally at least the distance of the relatively stationary undercut side piece, so that clearance may be provided. In any event, it is desirable to laterally move the undercut portions of the final product and side pieces for vertical clearance, so that the side pieces may move vertically downward about the right hand sprocket 12 for their return run to the entrance side of the pressure tunnel while the continuous product moves horizontally to a cutter or the like.

OPERATION

Using the molding system of the present invention, according to a preferred embodiment, a preformed outer cover laminate 27 may be fed to the entrance end 15 and placed upon the cover belt 23. Within the clamping zone 21, the converging guide tracks 51 engaging the side shift rollers 49 will cause the lower rigid conveyors 18, 19 to have their individual links 40 within the shifting zone to move laterally with respect to each other to effectively bring the corresponding individual side pieces 25 toward each other to clamp the sides of the preform 27, with the interior surface configuration of the side pieces 25, corresponding to the exterior side configuration of the preform. In such a position, the cover sheet 23, which may be eliminated with preforms, will span the joint between the rigid conveyors 18, 19. Thereafter, the upper cover belt 13 will be tightly guided around the wheel 12 so that it will be stretched and straight from side to side as it is applied to the upper surfaces, as shown in FIG. 3, of the side pieces 25, 26. Simultaneously, it will be clamped by the rigid backup belt 11, so that the flexible belt 13 will not thereafter sag in its middle when it is unsupported within the pressure tunnel to form wrinkles and the like, due to its being tightly clamped at its opposed ends while in its extended position. To further assure the transverse flatness or smooth condition of the cover belt 13, the tracks 51 may diverge just slightly downstream from the position at which the cover belt 13 is clamped by the backup rigid conveyor 11 so that the side pieces 25, 26, with preferably upper roughen surfaces, will pull the outer edges of the belt 13 away from each other to stretch the belt 13, with the adjacent surface of the rigid conveyor 11 being smooth to allow such stretching. This would open up the gap between the rigid conveyors 18, 19 only slightly, which may be easily compensated for by the cover flexible belt 23, which gap may be a few thousandths to ⅛ inch.

As soon as the pressure tunnel is formed as above, foamable synthetic resin may be injected, or the foamable synthetic resin may be applied to the preform 27 upstream, for example within the clamping zone 21. The resin may be foamed by any means, for example with the application of heat, within the pressure tunnel and thereafter partially or completely cured or set within the pressure tunnel to produce a rigid or semirigid product at the exit end 16. After exiting from the pressure tunnel, the sides of the final product will be unclamped within the unclamping zone 22, by coaction of the diverging guide tracks 51 and side shift rollers 49 causing the side pieces 25, 26 to separate so that their undercut mold cavities 29, 30 will completely clear the correspondingly shaped horizontal edge flanges of the final sheet product. This will allow the vertical movement of the side pieces downwardly as they pass around the sprocket 12 for the return run of the conveyor, while the final product continues in the conveying or molding direction horizontally to a cutter or the like subsequent operation.

While a specific product of laminated sheet 27 and foam core 28 has been shown in FIG. 3, further products and processes to produce them are contemplated. The undercuts 29, 30 may be of many different shapes. The sheet 27 may extend between the foam 28 and side piece 26, similar to the way it covers side piece 25. Further the sheet 27 may be eliminated wholly or partially between both side pieces 25, 26 and the foam 28.

A further embodiment of the present invention would involve the identical illustrated structure with only the following changes. The conveyor 18 with its guide tracks and rollers would be eliminated and the conveyor 19 transversely enlarged to generally the same width and aligned with conveyor 11; the guide tracks and rollers for conveyor 19 would correspondingly be laterally spread out to shift conveyor 19 at least twice the undercut width. With the side piece 25 connected to conveyor 11 and the side piece 26 connected with conveyor 19, the side pieces would move away from each other as before to unclamp the product. As modifications of this embodiment, both the upper conveyor 11 and lower conveyor 19 could be shifted in opposite directions, with suitable tracks and rollers provided for upper conveyor 11.

Further modifications, embodiments and variations are contemplated within the spirit and scope of the present invention as defined by the following claims.

What is claimed is:

1. Apparatus for the continuous molding of a product, comprising a first endless molding conveyor means, and a second opposed endless molding conveyor means having adjacent runs through a molding zone; said first conveyor means acting as a cover belt to said second conveyor means in said molding zone, said second conveyor means being longitudinally split into at least two generally aligned endless conveyors; at least one of said separate endless conveyors having a side flange within the molding zone closing the corresponding side space between said first and second conveyor means; and means shifting said at least one of said separate endless conveyors and side flange laterally, with respect to the conveying direction in the molding zone, toward the other of said separate endless conveyors at the upstream end of the molding zone, and shifting said at least one of said separate endless conveyors and its side flange away from the other of said separate endless conveyors at the downstream end of the molding zone.

2. The apparatus of claim 1, wherein said other of said separate endless conveyors includes a second side flange within the molding zone closing the corresponding side space between said first and second conveyor means along the side of the apparatus opposite from the first-mentioned side flange at least within the molding zone.

3. The apparatus of claim 2, including further means shifting said other of said separate endless conveyors and its side flange laterally toward said one of said separate endless conveyors at the upstream end of said molding zone and laterally away from said one of said separate endless conveyors at the downstream end of said molding zone.

4. The apparatus of claim 3, wherein said separate endless conveyors are constructed of a plurality of links having limited lateral movement with respect to each other; said shifting means having roller means on said links with axes perpendicular to the direction of conveyor travel through the molding zone and the lateral direction, and stationary converging, diverging track means receiving therein said rollers.

5. The apparatus of claim 4, wherein said conveyor links include flat base plates having opposite end return bend flanges, and C-shaped connecting members each engaging within adjacent return bend flanges; and each of said links having means on opposite sides of said C-shaped members spaced apart a greater distance than the length of said C-shaped members for providing a limited range of shifting movement of said links laterally with respect to each other.

6. The apparatus of claim 2, including a single flexible cover sheet overlying the molding surface of said first endless molding conveyor means, at least within the molding zone, and being clamped along its opposite edge portions between said side flanges and said first endless molding conveyor means.

7. The apparatus of claim 6, including means feeding said single flexible cover sheet an at angle to the conveying direction at the upsteam end of the molding zone into engagement with the adjacent surfaces of said side flanges and providing a rotatable support changing the angle of feed to that of the conveying direction to provide a stretched laterally straight flexible cover sheet immediately prior to clamping; and said side flanges and first endless molding conveyor means maintaining said single flexible cover sheet in its clamped position throughout the molding zone.

8. The apparatus of claim 7, wherein said separate endless conveyors and their carried side flanges are shifted laterally slightly away from each other after clamping said single flexible cover sheet to tightly stretch the flexible cover sheet laterally; and said separate endless conveyors remaining slightly spaced from each other throughout the molding zone to maintain the stretched condition of said flexible cover sheet within the molding zone.

9. The apparatus of claim 8, wherein the surfaces of said side flanges engaging said flexible cover sheet are roughen to provide a friction surface for gripping the side edges of the upper flexible cover belt.

10. The apparatus of claim 1, including a single, flexible cover sheet overlying the molding surface of each of said separate endless conveyors and spanning the joint therebetween.

11. The apparatus of claim 1, wherein said one separate endless conveyor is constructed of a plurality of links having limited lateral movement with respect to each other; said shifting means having roller means on said links with axes perpendicular to the direction of conveyor travel through the molding zone and the lateral direction, and stationary converging, diverging track means receiving therein said rollers.

12. The apparatus of claim 11, wherein said conveyor links include flat base plates having opposite end return bend flanges, and C-shaped connecting members each engaging within adjacent return bend flanges; and each of said links having means on opposite sides of said C-shaped members spaced apart a greater distance than the length of said C-shaped members for providing a limited range of shifting movement of said links laterally with respect to each other.

13. Apparatus for the continuous molding of a product, comprising: a first endless molding conveyor means having a conveyor run; a second opposed endless molding conveyor means having a conveyor run adjacent the corresponding conveyor run of said first endless molding conveyor means said first conveyor means acting as a cover belt to said second conveyor means in said molding zone; opposed side piece means forming with said first and second endless molding conveyor means runs a substantially closed molding tunnel; means drivingly interconnecting at least one of said side piece means and at least a portion of one of said endless molding conveyor means at least along said runs; and means shifting said at least one portion of said one endless molding conveyor means and its side piece means laterally, with respect to the conveying direction in the molding tunnel, toward the other of said side piece means at the upstream end of said molding tunnel, and shifting said at least one portion of said one endless molding conveyor means and its side piece means away from the other of said side piece means at the downstream end of the molding tunnel.

14. The apparatus of claim 13, wherein said other side piece means is drivingly interconnected with at least one portion of said other endless molding conveyor means; and means shifting said at least one portion of said other endless conveyor means and its side piece means laterally toward the one of said side piece means at the upstream end of said molding tunnel, and shifting said at least one portion of said other endless molding conveyor means and its side piece means away from the one of said side piece means at the downstream end of the molding tunnel.

15. The apparatus of claim 14, wherein each of said endless molding conveyor means is a single endless belt conveyor.

16. The apparatus of claim 15, wherein each single endless belt is composed of a plurality of rigid plates extending substantially the full lateral width of the belt and edge interconnected in a chain with lateral shifting lost motion.

17. The apparatus of claim 16, wherein said shifting means includes fixed guide tracks, and rollers secured to said plates and guidingly received within said tracks.

* * * * *